Dec. 6, 1966 J. J. YUZA 3,289,895
BEVERAGE DISPENSERS

Filed March 27, 1964 3 Sheets-Sheet 1

Inventor
JOSEPH J. YUZA
By Wallace, Kinzer and Dorn
Attorneys

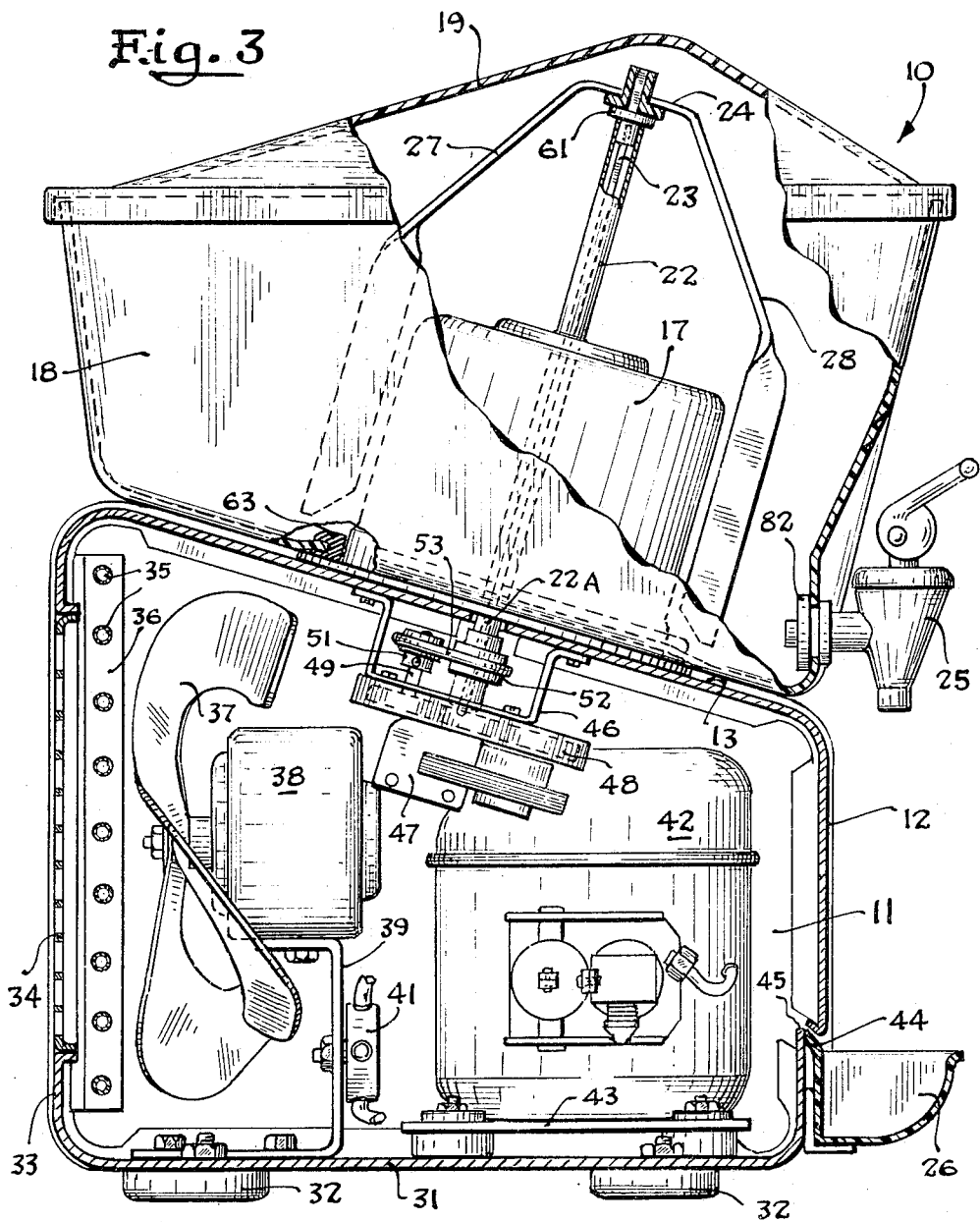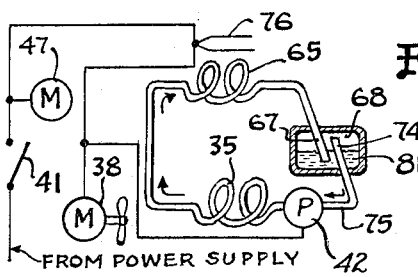

Dec. 6, 1966   J. J. YUZA   3,289,895
BEVERAGE DISPENSERS
Filed March 27, 1964   3 Sheets-Sheet 3
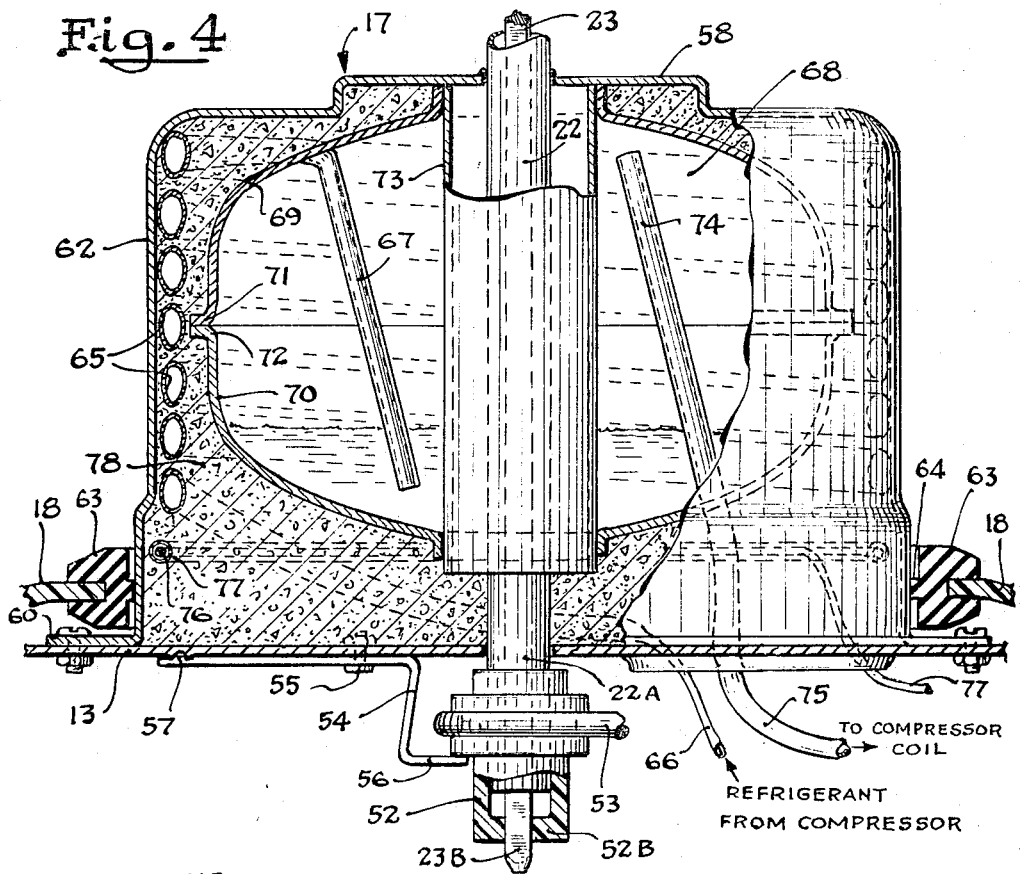
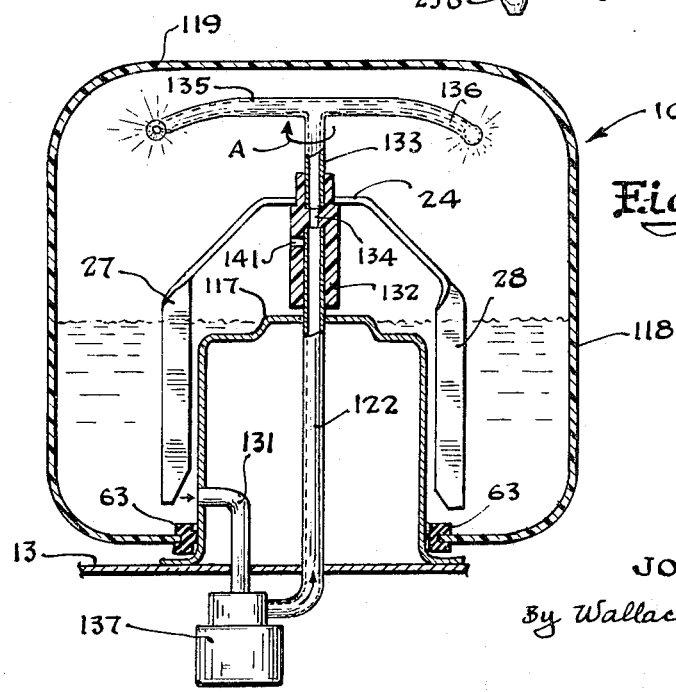
Inventor
JOSEPH J. YUZA
By Wallace, Kinzer and Dorn
Attorneys United States Patent Office 3,289,895
Patented Dec. 6, 1966

3,289,895
BEVERAGE DISPENSERS
Joseph J. Yuza, Chicago, Ill., assignor to The Bastian-Blessing Company, Chicago, Ill., a corporation of Illinois
Filed Mar. 27, 1964, Ser. No. 355,274
6 Claims. (Cl. 222—146)

This invention relates to a new and improved beverage dispensing device and more particularly to a beverage dispenser of the kind employed in restaurants, lunch counters and the like, for dispensing natural and artificial fruit drinks and other refrigerated beverages.

In beverage dispensers of the kind used for chilling and dispensing natural fruit drinks, artificial fruit drinks, and similar beverages, problems are often encountered with respect to leakage and accessibility for cleaning. To pass the relatively rigid and demanding standards applied to dispensers of this kind, it is necessary to protect the dispenser against any potential leakage of oil, refrigerant, or other foreign material into the container for the beverage. Of almost equal importance is the necessity for preventing the beverage from leaking into the working parts of the dispenser, particularly since many beverages, such as natural and artificial orange juice, are quite corrosive.

In dispensers of this kind, it is frequently desirable to provide a means for agitating the beverage to maintain uniform consistency therein and to assure uniform cooling of the beverage. Previously known beverage dispensers utilizing rotary seals of one kind or another to seal the agitating apparatus have presented substantial difficulties because the rotary seals tend to fail and to leak due to cumulative aging and to corrosion through contact with the beverage. Another problem encountered with conventional beverage dispensers is a substantial tendency to accumulate sediment in the bottom of the beverage tank, with the result that at least a small quantity of the beverage must be discarded when the tank is nearly empty. Furthermore, it has been quite difficult to achieve uniform cooling of the beverage, particularly where the dispenser may be operated with a relatively large quantity of beverage in the tank (three to twelve gallons) down to only a very small amount of beverage.

It is a principal object of the present invention, therefore, to provide a new and improved beverage dispenser apparatus that effectively eliminates or minimizes the problems and difficulties encountered in previously known devices as set forth hereinabove.

A specific object of the invention is to afford a new and improved rotary stirring apparatus for a beverage dispenser that employs no rotary seals and positively preclude leakage of the beverage from the tank and that also prevents introduction of oil and refrigerant into the beverage.

Another object of the invention is to provide a new and improved rotary agitating apparatus for a beverage dispenser, the component parts of which may all be quickly and conveniently removed from the dispenser for cleaning.

A further object of the invention is to afford a novel agitator mechanism for a juice or other beverage dispenser that is also effective to prevent ice accumulation on the refrigerating elements of the dispenser.

Another object of the invention is to provide uniform cooling of natural or artificial fruit juices or other beverages, in a beverage dispenser, over the full capacity range of the dispenser from a very small quantity to several gallons of beverage.

A specific object of the invention is to provide a new and improved accumulator apparatus for the refrigerating system of a beverage dispenser.

A corollary object of the invention is to afford a new and improved beverage dispenser having the foregoing operating attributes that is compact in size and simple, efficient, and economical in construction.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 3 is a partially sectional side elevation view of the beverage dispenser illustrating its principal operating components;

FIG. 3A is a simplified schematic diagram of the refrigerant circulation and electrical control elements of the beverage dispenser;

FIG. 4 is a partially sectional elevation view, drawn to an enlarged scale, of the refrigerator dome of the beverage dispenser of FIGS. 1–3; and FIG. 5 is a sectional elevational view, partially schematic, of a beverage dispenser constructed in accordance with another embodiment of the present invention.

Figure 1:
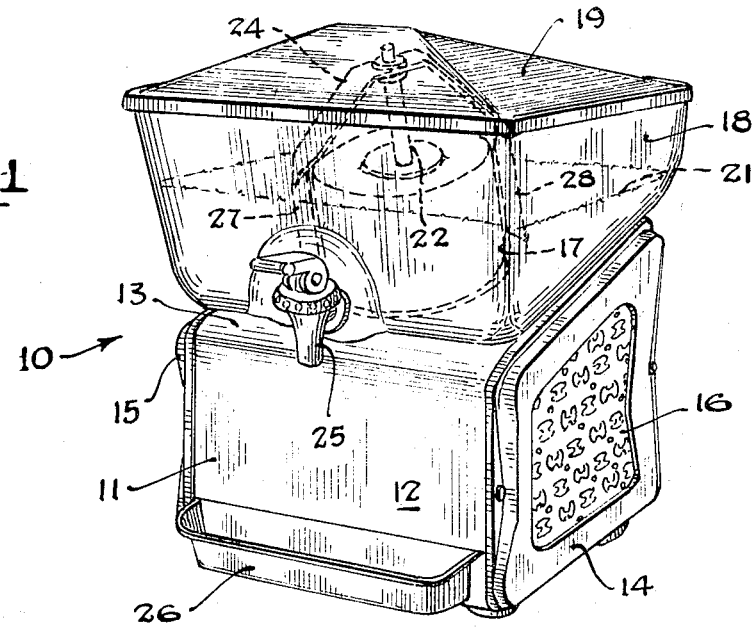
FIG. 1 is a front view, in perspective, of a beverage dispenser constructed in accordance with one embodiment of the present invention.
Figure 2:
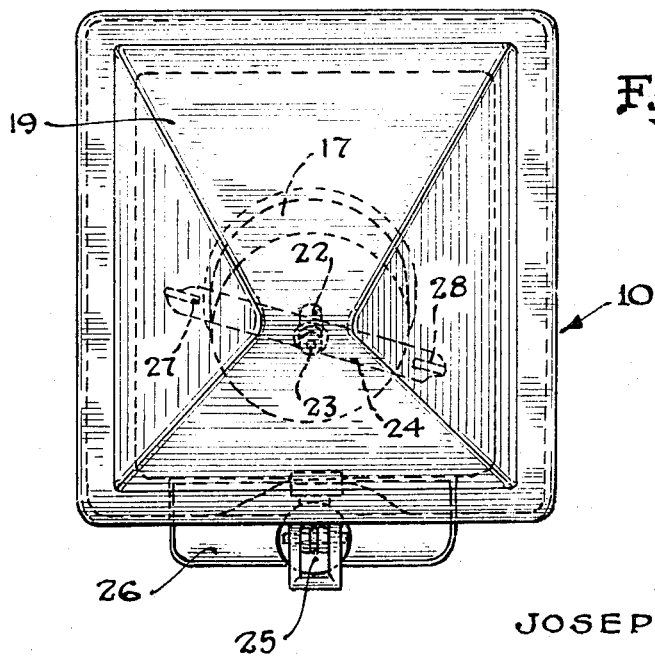
FIG. 2 is a plan view of the beverage dispenser of FIG. 1.

FIGS. 1 and 2 constitute exterior views of a beverage dispenser 10 constructed in accordance with one embodiment of the present invention. Beverage dispenser 10 is particularly advantageous when employed for dispensing natural fruit juices, such as orange juice, with respect to which aeration is not particularly desirable. This same dispenser, however, can also be employed for a variety of artificial fruit beverages and other beverages.

Dispenser 10 comprises a base 11 having a front wall 12 and a top wall 13. The front wall 12 is essentially vertical but the top wall 13 is inclined at a substantial angle to the horizontal. Base 11 is also provided with side wall covers 14 and 15. Preferably, both of the side walls have relatively large central openings covered by masking grills such as the ornamental grill 16 of side cover. In a typical construction, the front and top walls of base 11, and the bottom of the base as well, are of unitary construction formed from a single sheet of stainless steel, with appropriate bracing to afford a rigid base structure. The peripheral portion of side wall cover 14 may be fabricated of a suitable plastic material and an aluminum, stainless steel, or other non-corrosive material may be used for grill 16.

A ferfrigerator dome 17 is mounted on and projects above the top wall 13 of base 11, near the center of the top wall. Dome 17 encompasses a cooling coil, as described more fully hereinafter. The dome is preferably fabricated from drawn stainless steel and may be bolted or otherwise suitably secured to the top wall 13 of the dispenser base.

A beverage storage bowl 18 is mounted on the top of the dispenser base 11. Bowl 18 is provided with a central opening so that the bowl fits around refrigeration dome 17 with the dome projecting upwardly into the bowl; the edge of the bowl is sealed to the refrigeration dome as described in detail hereinafter. Bowl 18 may be formed from glass but preferably is constructed of a relatively thick clear plastic so that the bowl is lighter in weight and less likely to be broken than if glass construction is used. The bottom wall of the bowl is inclined at an angle, when the bowl is in mounted position so that it is firmly supported upon the top wall 13 of the dispenser base. The upper rim of bowl 18, however, is approximately horizontal. A transparent plastic or other suitable lid 19 is provided for the bowl to prevent contamination of the beverage 21 stored within the bowl during use of the dispenser.

Dispenser 10 further includes a hollow stationary bearing shaft 22 that projects upwardly from the center of refrigeration dome 17. The top end of shaft 22 is preferably located above the upper rim of bowl 18, so that it is always free of the beverage 21 within the bowl even when the bowl is filled to maximum capacity. A rotatable agitator drive shaft 23 extends downwardly through bearing shaft 22. Shaft 23 carries an agitator 24 having one or more paddle arms that extend outwardly and downwardly from the shaft into close proximity to the sides of refrigeration dome 17. In the illustrated construction, agitator 24 has two arms 27 and 28. The agitator can be fabricated from stainless steel or other non-corrosive metal. In the preferred construction, however, the agitator is made of a relatively thick transparent plastic material to reduce the conspicuousness of the agitator during operation of the dispenser.

At the forward lower end of bowl 18, the bowl is provided with an outlet opening, a spigot 25 being connected to the outlet opening. The spigot 25 is employed to draw off the beverage 21 from bowl 18. Preferably, a drip cup 26 is removably mounted upon base 11 below spigot 25.

Use of dispenser 10 is essentially conventional. With the dispenser assembled, as shown in FIGS. 1 and 2, cover 19 may be removed to introduce a supply of beverage 21 into bowl 18. The beverage is refrigerated by contact with refrigeration dome 17. Agitator 24 is continuously rotated to stir up the contents of the bowl and to facilitate the refrigeration operation. The paddle members 27 and 28, passing immediately adjacent the exterior of dome 17, prevent the formation of any substantial quantity of ice on the refrigeration dome, avoiding an unsightly appearance that could result from excessive ice formation and also improving the efficiency of the refrigeration operation. The beverage is drawn off from bowl 18, as required, through spigot 25. Whenever the supply of beverage in bowl 18 is exhausted or is depleted to a point near exhaustion, the supply is replenished.

FIGS. 3 and 4 afford a more detailed illustration of the construction of the principal components of beverage dispenser 10 and the operating equipment incorporated in the dispenser. As shown in FIG. 3, the base 11 of the beverage dispenser includes a bottom wall 31 having a plurality of rubber feet 32 mounted thereon to support the dispenser on a countertop or other suitable surface. The back wall 33 of base 11 is provided with an enlarged opening which may be covered by a removable grill 34. A heat exchanger coil 35 is mounted behind grill 34; coil 35 may be incorporated in a finned heat-transfer structure 36 to provide for optimum heat transfer. A fan 37 is located immediately adjacent coil 35. Fan 37 is driven by a motor 38 that is mounted upon a bracket 39 which, in turn, is supported upon the bottom wall 31 of the dispenser base. The bracket 39 may also be used to support a suitable on-off switch 41 for the electrically actuated components of the beverage dispenser.

A conventional compressor pump 42 is also mounted within base 11, being supported upon a mounting plate 43 that is in turn secured to the bottom wall 31 of the dispenser base.

FIG. 3 also shows the mounting for drip cup 26; the drip cup is provided with a flange 44 that extends into a slot 45 in the base and is held in position by engagement with a relatively short re-entrant flange on the bottom of front wall 12.

A U-shaped bracket 46 is mounted upon the underside of the top 13 of the dispenser base, extending down into the enclosed chamber of the base. A small electric motor 47 is suspended from bracket 46; preferably, motor 47 is an inexpensive shaded pole gear motor provided with an integral gear box 48 so that the output shaft 49 of the gear motor is driven at a relatively slow speed. A pulley 51 is mounted upon the motor shaft 49. Pulley 51 is aligned with a drive pulley 52 that is journalled upon a downwardly extending portion 22A of the fixed hollow bearing shaft 22. A drive belt 53 extends around pulleys 51 and 52 to afford a driving connection from the motor to pulley 52.

The construction and arrangement employed for drive pulley 52, and its relationship to the agitator shaft 23, are best shown in the enlarged scale detail view of FIG. 4. As shown therein, pulley 52 may comprise a molded plastic member. For example, the pulley may be molded of nylon or other generally self-lubricating plastic suitable for use in a bearing without requiring lubrication. Pulley 52 would normally be maintained in its position on the downwardly extending portion 22A of the fixed hollow bearing shaft 22 by the limited friction between the two bearing members and by the belt 53. It is advisable, however, to afford additional support for the pulley, particularly since the pulley may be subject to some downward force as described more fully hereinafter. To this end, a sheet metal bracket 54 is pivotally mounted upon the top 13 of the dispenser base, as by a pivot screw 55. Bracket 54 includes a flange 56 that engages pulley 52 and holds it in its operative position on fixed shaft extension 22A. Bracket 54 may be provided with a small detent element 57 that engages in a depression in base member 13 to prevent pivotal movement of the bracket except when it is desired to remove pulley 52 for cleaning or other maintenance purposes.

As shown in FIG. 4, the fixed hollow bearing shaft 22 extends upwardly through refrigeration dome 17. Where the shaft passes through the top 58 of the refrigeration dome, it is welded or otherwise positively sealed to the dome to prevent any leakage of beverage along the shaft.

As noted hereinabove, agitator shaft 23 extends downwardly through the hollow bearing shaft 22. Shaft 23, at least at its lower end 23B, is of square configuration and fits into a square opening in the bottom portion 52B of pulley 52. In this manner, a driving connection is completed between pulley 52 and shaft 23. Of course, a hexagonal or other configuration effective to connect the shaft 23 and pulley 52 in driving relationship may be utilized if desired, instead of the square configuration illustrated. Furthermore, shaft 23 may be of square, hexagonal or other non-circular configuration throughout its length.

The top end of shaft 23, as shown in FIG. 3, carries a thrust bearing member 61. Like the pulley and bearing member 52, bearing member 61 is preferably fabricated from a molded plastic, such as nylon, having effective self-lubricating properties when employed as a bearing. The upper end of shaft 23 may be threaded into bearing member 61 or may be otherwise secured thereto. The agitator 24, with its two paddle arms 27 and 28, is secured to bearing member 61, thereby effectively mounting the agitator on the upper end of shaft 23. As noted hereinabove, the end of bearing shaft 22 upon which bearing member 61 rests is located well above the top of the bowl 18, this being done to preclude leakage of the beverage down through shaft 22 into the base 11 of the dispenser.

Again referring to FIG. 4, it is seen that refrigeration dome 17 includes an outer metal shell 62. This shell is preferably formed from stainless steel, although other materials having reasonably good heat-transfer characteristics and suitable for direct contact with acid beverages could be used if desired.

The lower portion of shell 62 is provided with an outwardly extending flange 60 which is bolted or otherwise suitably secured to the top plate 13 of the dispenser base. The bowl 18 is sealed to dome 17 by means of a vinyl or other annular elastomer seal member 63. The seal ring 63 is fitted around the lip of a central opening in the bottom of bowl 18 and is provided with a sealing projection 64 that fits tightly around the base of refrigeration dome 17.

Refrigeration dome 17 includes a cooling coil 65. Coil 65 may be fabricated from copper or other metal having good heat transfer characteristics. The individual turns of coil 65 are preferably directly engaged with the inner surface of the stainless steel shell 62 in good heat-transfer relationship. One end of coil 65 is connected by a capillary tube 66 to the compressor 42 through coil 35 (see FIGS. 3 and 3A). The other end of the coil terminates in a discharge tube 67 that extends into an accumulator 68 located within refrigeration dome 17.

Accumulator 68, FIG. 4, comprises two substantially cup-shaped metal shells 69 and 70 defining an enclosed annular chamber in dome 17. The shells 69 and 70 are sealed together at their flanges 71 and 72. Each of the shells is provided with central axial opening, the shells being outwardly flanged about the central opening. These central flanges are welded or otherwise sealed to a vertical tube 73 that extends through the upper portion of dome 17, the upper end of tube 73 being secured to the top 58 of the dome shell 62. The lower end of tube 73 may extend to the top 13 of the dispenser base, but preferably is short enough to clear member 13.

A drainage tube 74 extends upwardly into accumulator 68. This drainage tube is connected to a suction tube 75 that is connected back to compressor 42.

In addition to cooling coil 65, refrigeration dome 17 includes a thermostat for controlling operation of the refrigeration apparatus of the beverage dispenser. The thermostat 76 is a relatively long flexible bi-metal member that extends into a tubular housing 77 in the lower portion of dome 17. Preferably, housing 77 is fabricated from copper tubing or other high conductivity material and is disposed in heat-transferring engagement with the lower portion of the shell 62 of the refrigeration dome.

In mounting a cooling coil such as coil 65 within a metal shell such as the shell 62 of refrigeration dome 17, it is difficult to assure continuing contact of each turn of the coil with the external shell. This is particularly true where the cooling coil is fabricated from a soft material such as copper and has a tendency to bend or otherwise deform as the coil is inserted in the shell. To assure effective heat transfer between the cooling coil and the shell, the dome 17 is filled with a heat-transfer material encompassing the cooling coil 65 and assuring good heat transfer between the coil and the shell 62. The heat transfer filling 78 should be a non-porous material, sealed against moisture and other contaminants. In the preferred embodiment of the present invention, the portion of dome 17 encompassing coil 65, and indeed the entire dome outside of accumulator 68, is filled with an epoxy resin and appropriate filler material. The epoxy resin itself is not a particularly good heat transfer element but the filler material is selected to afford good heat transfer characteristics for those areas where the filler material is required to bridge the gap between a part of coil 65 and shell 62. Good results have been obtained using an epoxy resin filled with silica. A bulk aggregate may also be added to reduce the cost.

FIG. 3A affords a simplified schematic illustration of the refrigerant circulation system and the electrical control system for beverage dispenser 10. As shown therein, the discharge port of compressor pump 42 is connected to the refrigerating coil 65 located in the dispenser dome 17 (see FIG. 4) through the condenser coil 35. The liquified refrigerant from the compressor expands in coil 65, the vaporized refrigerant being discharged into accumulator 68 through the discharge tube 67. Accumulator 68 is used to compensate for possible variations in the charge requirements of the system; in a small refrigerating system such as used by the dispenser, it is difficult to get the exact refrigerant charge required. Consequently, a reserve supply 81 of refrigerant is maintained in the accumulator. From the accumulator the vaporized refrigerant is withdrawn through tube 74 and the connecting suction line 75. It should be noted that the inlet to tube 74 is well above the level of any liquid refrigerant 81 in accumulator 68. The refrigerant vapor is supplied back to the inlet of compressor pump 42.

In the electrical control system illustrated in FIG. 3A, the agitator drive motor 47 is connected directly to a suitable power supply through a switch 41. The same switch closes an operating circuit for compressor pump 42 and fan motor 38. This latter circuit, however, includes the thermostat 76, which is effective to de-energize both the fan motor and the compressor when the beverage has been refrigerated to the desired extent. Thermostat 76 is shown directly connected in the energizing circuit for motor 38 and pump 42; it will be recognized, however, that the thermostat is usually employed to actuate a control relay in accordance with conventional practice in the art.

One important advantage of the dispenser 10 is that all of the major operating parts contacting the beverage in bowl 18, including the bowl itself, can be readily and conveniently removed for cleaning. Spigot 25 is removably mounted in a suitable seal member 82 in the wall of the bowl, near the lowermost point on the bowl. The spigot can be removed and cleaned quite conveniently. The location of the spigot is also quite important because it permits effective use of the dispenser even though the supply of liquid in bowl 18 has been reduced to a very minor fraction of its capacity. This maintenance of operation virtually to the last drop in the bowl is also facilitated by the angular orientation of the base of the bowl, any available beverage in the bowl tending to flow downwardly thereof to where it can be dispensed through spigot 25 (see FIG. 3).

The first step in cleaning the dispenser is to remove the dome cover 19. Next, the complete agitator and agitator shaft assembly 24, 23 is removed simply by lifting the agitator out of the hollow bearing shaft 22. Thus, the agitator can be completely cleaned away from the dispenser. Finally, bowl 18 can be lifted from the base of the dispenser and removed to a sink or other suitable facility for complete cleaning.

Because the agitator 24 is supported on shaft 22 well above the supply of beverage in bowl 18, it is impossible for the beverage to flow downwardly through shaft 22 into the base 11 of the dispenser. Consequently, the orange juice or other beverage dispensed by device 10 is kept completely away from the operating parts of the equipment, including particularly the motors, and cannot cause corrosion or other damage thereto. The base of the dispenser is completely sealed, with no rotating seals to wear out or otherwise deteriorate.

Replacement of the bowl and agitator elements on the base of the dispenser can be accomplished in a matter of one or two minutes. The bowl 18 is first mounted in position on the base of the dispenser, with the sealing ring 63 sealing the bowl against the refrigeration dome 17. The agitator 24 is then mounted in place, inserting shaft 23 downwardly through the hollow bearing shaft 22. It may be necessary to turn the agitator very slightly in order to assure engagement of the bottom end 23B of the agitator shaft in the drive pulley 52 that rotates the shaft (see FIG. 4). The bracket 54 gives positive assurance that the drive pulley will not be displaced from its operative position when the shaft 23 is being engaged with the pulley. The dispenser is now ready to receive a supply of beverage. Once bowl 18 is filled lid 19 is replaced and the dispenser is completely set for operation.

It is also a relatively simple matter to remove pulley 52 for cleaning or servicing. To this end, bracket 54 may be pivoted out of engagement with the pulley. Belt 53 is then released from the pulley, being pushed upwardly out of the pulley grooves, and the pulley is simply pulled off of the lower end 22A of bearing shaft 22. The particular style of drive belt employed in the dispenser is not critical; a rubber drive belt similar to an O-ring sealing member has been employed successfully and good results have also been obtained with a V-shaped drive belt of rubber or other somewhat elastic material.

The normal tendency toward accumulation of ice on the surface of dome 17 is effectively minimized and, indeed, virtually eliminated by the movement of agitator paddles 27 and 28 immediately adjacent the dome. As noted above, accumulator 68 protects the system against undesired effects from an overcharge of refrigerant; at the same time, the accumulator is compactly mounted within the refrigeration dome and does not add to the complexity of the system with respect to equipment requiring servicing or maintenance. Since the accumulator is totally encased in the filler material 78, the possibility of any leak from the accumulator is virtually nonexistent. There is little or no opportunity for contamination of the beverage as a result of introduction of oil from motor 47 or refrigerant from coil 65 or from the accumulator.

Dispenser 10, as described hereinabove in connection with FIGS. 1 through 4, is primarily intended for use with natural juices, where aeration of the beverage is not desirable. With artificial fruit flavor beverages, aeration of the beverage is permissible and frequently advantageous. FIG. 5 illustrates a beverage dispenser 100 constructed in accordance with another embodiment of the present invention and capable of aerating the beverage.

The dispenser 100 illustrated in simplified and partially schematic form in FIG. 5 comprises a base which may be generally similar to the base of dispenser 10, only the top plate 13 of the base frame being illustrated. A refrigeration dome 117 is mounted upon the base member 13 projecting upwardly thereof. Refrigeration dome 117 is essentially similar to dome 17 as described in detail hereinabove, the only departure from the previously described construction constituting a beverage conduit 131 that is incorporated in the refrigeration dome and extends from a point near the base of the dome downwardly below base member 13. Inasmuch as the construction is the same as that described before, the refrigerating coil, the accumulator, the thermostat and the thermally conductive filling for refrigeration dome 117 have not been shown in FIG. 5.

As in the previous embodiment, a hollow shaft or conduit 122 extends upwardly through the central portion of refrigeration dome 117, the lower end of this conduit terminating below the base member 13. A molded nylon bearing and conduit member 132 is rotatably mounted upon the upper end of the hollow shaft 122. Agitator 24 is press fit onto the upper end of bearing member 132.

The upper portion of the bearing member 132 is provided with an axial opening into which a discharge device conduit 133 is fitted, there being a further axial opening 134 in bearing member 132 affording a connection between the hollow shaft 122 and discharge device 133. The upper end of discharge device 133 branches out in a T-shaped configuration comprising two arms 135 and 136 much like the arms of a conventional lawn sprinkler. Each of the arms 135 and 136 is provided with a discharge opening at the outer end, the two discharge openings facing in opposite directions so that the T-shaped device 133 is rotated upon discharge of fluid from the ends of the arms. In the illustrated arrangement, the discharge openings are so located that discharge device 133 is driven in the direction indicated by the arrow A.

As before, dispenser 100 includes a bowl 118 having a lid 119. The lower end of bowl 118 is sealed to the exterior surface of refrigeration dome 117 by the sealing ring 63.

In dispenser 100, there is no separate mechanical drive for agitator 24. Thus, the electrical motor employed for this purpose in the dispenser 10 is eliminated. However, an electrically operated pump 137 is incorporated in dispenser 100. The inlet of the pump is connected to conduit 131 and the outlet of the pump is connected to the hollow shaft or conduit 122 extending upwardly through the refrigeration dome. Pump 137 may constitute any sealed pump suitable for use in pumping beverages; a preferred form of pump is that described in the copending application of Joseph J. Yuza and Rudolph A. Yuza, Serial No. 42,784, filed July 14, 1960, now Patent No. 3,198,125 issued Aug. 3, 1965.

The basic operation of dispenser 100 is in many respects similar to that of dispenser 10. The drive means for agitator 24, however, is quite different and comprises pump 137 and the discharge device 133. Pump 137 is maintained continuously energized during use of the beverage dispenser. It draws beverage from bowl 118 through conduit 131 and pumps the beverage upwardly through the hollow bearing shaft 122 and into device 133. The beverage is discharged outwardly of device 133, through the two arms 135 and 136, rotating the device as a reaction to the discharge of beverage back into bowl 118. Since agitator 124 is fixed to bearing member 132 and since the discharge device 133 is also affixed thereto, the agitator is rotated along with the discharge device.

The lower portion of bearing member 132 is preferably made of substantial length to afford a good bearing support on shaft 122, as required by the additional weight added by the discharge device for the beverage. A relief aperture 141 is provided in bearing member 132 to prevent the agitator assembly from lifting upwardly of the end of hollow shaft 122 and falling off of the shaft as the result of a build-up of pressure within the bearing member. The pressure of the fluid pumped by pump 137 is sufficiently high so that the beverage is sprayed outwardly against the walls of bowl 118, continually cascading down the interior of the bowl.

Hence, while preferred embodiments of the invention have been described and illustrated, it is to be understood that they are capable of variation and modification.

I claim:

1. A beverage dispenser for dispensing natural and artificial fruit beverages and the like comprising:

a base including a refrigerating apparatus;

a thermally conductive dome mounted on said base and containing a cooling coil connected to said refrigerating apparatus, said dome being filled with a material comprising an epoxy resin mixed with silica as a thermally conductive filler and with a bulk aggregate material;

a beverage storage bowl mounted on said base in encompassing relation to said dome, said dome projecting upwardly into said bowl;

a fixed hollow bearing shaft extending from said base upwardly through and above said dome, said bearing shaft being peripherally sealed to said dome;

an agitator rotatably mounted on said fixed bearing shaft above said dome and including at least one paddle arm extending downwardly into said bowl immediately adjacent said dome and substantially parallel to the side of said dome;

and means for rotating said agitator around said dome to circulate beverage within said bowl immediately adjacent said dome and to prevent ice formation on said dome.

2. A beverage dispenser for dispensing natural and artificial fruit beverages and the like comprising:

a base, including a refrigerating apparatus, having a top support member inclined at a substantial angle to the horizontal;

a thermally conductive dome mounted on said base and containing a cooling coil connected to said refrigerating apparatus, said dome being filled with a material comprising an epoxy resin mixed with silica as a thermally conductive filler and with a bulk aggregate material;

a beverage storage bowl removably mounted on said base in encompassing relation to said dome with said dome projecting up into the center of the bowl, the bottom of the bowl being inclined at an angle to the horizontal corresponding to the angle of said support member;

a fixed hollow bearing shaft extending from said base upwardly through and above said dome, said bearing shaft being peripherally sealed to said dome;

an agitator rotatably mounted on said fixed bearing shaft above said dome and including at least one paddle arm extending downwardly into said bowl substantially parallel to and imediately adjacent the side of said dome;

means for rotating said agitator to circulate beverage within said bowl immediately around said dome to thereby prevent ice formation on said dome;

and spigot means connected directly to said bowl, near the lowest point on the bowl, for dispensing beverage from the bowl.

3. A beverage dispenser for dispensing natural and artificial fruit beverages and the like comprising:

a base including a refrigerating apparatus;

a thermally conductive dome mounted on said base and containing a cooling coil connected to said refrigerating apparatus, said dome being filled with a material comprising an epoxy resin mixed with silica as a thermally conductive filler and with a bulk aggregate material;

a beverage storage bowl mounted on said base in encompassing relation to said dome, said dome projecting upwardly into said bowl;

a fixed hollow bearing shaft extending from said base below said dome upwardly through said dome and above the top of said bowl, said bearing shaft being peripherally sealed to said dome;

an agitator rotatably mounted on said fixed bearing shaft above said dome and including at least one paddle arm extending downwardly into said bowl substantially parallel to and immediately adjacent the side of said dome;

a drive pulley journalled on the lower end of said bearing shaft, said drive pulley having a polygonal socket therein aligned with the bore of said bearing shaft;

a drive shaft affixed to said agitator and extending downwardly through said bearing shaft into engagement with said pulley, the lower end of said drive shaft being complemental in configuration to the socket in said pulley to permit completion of a driving connection between said pulley and said drive shaft upon insertion of said drive shaft downwardly through said bearing shaft and into engagement with said socket;

and a motor, mounted within said base and connected to said drive pulley for driving said pulley, said drive shaft and said agitator to agitate beverage within said bowl immediately around said dome and thereby prevent ice formation on said dome.

4. A beverage dispenser for dispensing natural and artificial fruit beverages and the like comprising:

a base including a refrigerating apparatus;

a thermally conductive dome mounted on said base and containing a cooling coil connected to said refrigerating apparatus;

a thermally sensitive control element mounted within said dome;

an accumulator mounted within said dome and interposed in the connection between said cooling coil and said refrigerating apparatus;

a waterproof, thermally conductive filler material comprising a resin and a thermally conductive aggregate, filling and sealing the interior of said dome and affording a heat transfer path between said dome, said cooling coil, said control element and said accumulator;

a bowl mounted on said base in encompassing relation to said dome;

a fixed hollow bearing shaft extending from said base upwardly through and above said dome, said bearing shaft being peripherally sealed to said dome;

an agitator rotatably mounted on said fixed bearing shaft above said dome and including at least one paddle arm extending downwardly into said bowl substantially parallel to and immediately adjacent the side of said dome;

and means for rotating said agitator to circulate beverage within said bowl immediately around said dome to thereby prevent ice formation on said dome.

5. A beverage dispenser for dispensing natural and artificial fruit beverages and the like comprising:

a base including a refrigerating apparatus;

a thermally conductive dome mounted on said base and containing a cooling coil connected to said refrigerating apparatus;

a beverage storage bowl mounted on said base in encompassing relation to said dome, said dome projecting upwardly into said bowl;

a fixed hollow bearing shaft extending from said base upwardly through and above said dome, said bearing shaft being peripherally sealed to said dome;

an agitator rotatably mounted on said fixed bearing shaft above said dome and including at least one paddle arm extending downwardly into said bowl substantially parallel to and immediately adjacent the side of said dome;

and means for rotating said agitator to circulate beverage within said bowl immediately adjacent said dome and to thereby prevent ice formation on said dome, said means comprising a pump having an inlet connected to the bottom portion of said bowl and an outlet connected to the bottom of said bearing shaft to pump beverage upwardly through said bearing shaft, and a discharge device mounted on said agitator and connected to receive beverage from said bearing shaft and discharge the beverage back into said bowl, rotating said agitator as a reaction to the discharge of beverage into the bowl.

6. A beverage dispenser for dispensing natural and artificial fruit beverages and the like comprising:

a base including a refrigerating apparatus;

a thermally conductive dome mounted on said base and containing a cooling coil connected to said refrigerating apparatus;

a waterproof, thermally conductive filler material filling and sealing said dome and affording a heat transfer path from said dome to said cooling coil;

a beverage storage bowl mounted on said base in encompassing relation to said dome, said dome projecting upwardly into said bowl;

a fixed hollow bearing shaft extending from said base upwardly through and above said dome, said bearing shaft being peripherally sealed to said dome;

an agitator rotatably mounted on said fixed bearing shaft above said dome and including at least one paddle arm extending downwardly into said bowl substantially parallel to and immediately adjacent the side of said dome;

and means for rotating said agitator to circulate beverage within said bowl immediately around said dome to thereby prevent ice formation on said dome, said means comprising a pump having an inlet connected to the bottom portion of said bowl and an outlet connected to the bottom of said bearing shaft to pump beverage upwardly through said bearing shaft, and a discharge device mounted on said agitator and connected to receive beverage from said bearing shaft and discharge the beverage back into said bowl, rotating said agitator as a reaction to the discharge of beverage into the bowl.

References Cited by the Examiner

UNITED STATES PATENTS

| | | |
|---|---|---|
| 2,006,299 | 6/1935 | Kaestner. |
| 2,486,822 | 11/1949 | Cameron. |
| 2,513,610 | 7/1950 | Williams _____ 62—392 |
| 2,657,554 | 11/1953 | Hull _____ 62—392 |
| 2,710,707 | 6/1955 | Persak _____ 62—392 X |
| 2,734,357 | 2/1956 | Fischer et al. _____ 62—392 |
| 2,740,264 | 4/1956 | Thompson. |

ROBERT B. REEVES, *Primary Examiner.*

LOUIS J. DEMBO, *Examiner.*

F. R. HANDREN, H. S. LANE, *Assistant Examiners.*